(12) United States Patent
Alon et al.

(10) Patent No.: US 11,929,779 B2
(45) Date of Patent: Mar. 12, 2024

(54) FEEDBACK-BASED FREQUENCY HOPPING

(71) Applicant: Apple Inc., Cupertino, CA (US)

(72) Inventors: Tomar Alon, Tel Aviv (IL); Alon Paycher, Beit Hananya (IL); Moche Cohen, Herzliya (IL)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 17/448,455

(22) Filed: Sep. 22, 2021

(65) Prior Publication Data

US 2023/0100388 A1    Mar. 30, 2023

(51) Int. Cl.
*H04B 1/713* (2011.01)
*H04L 1/1607* (2023.01)
*H04W 72/0453* (2023.01)

(52) U.S. Cl.
CPC .......... *H04B 1/713* (2013.01); *H04L 1/1607* (2013.01); *H04W 72/0453* (2013.01)

(58) Field of Classification Search
CPC .......... H04B 1/713; H04B 2201/71323; H04B 2201/71346; H04B 2201/71376; H04L 1/1607; H04L 1/08; H04L 1/1825; H04L 1/1864; H04L 1/1893; H04W 72/0453
See application file for complete search history.

(56) References Cited

U.S. PATENT DOCUMENTS

| | | | |
|---|---|---|---|
| 11,147,040 B1* | 10/2021 | Zana | H04W 72/0453 |
| 11,452,110 B1* | 9/2022 | Jorgovanovic | H04L 69/14 |
| 2015/0092708 A1* | 4/2015 | Su | H04W 76/16 370/329 |
| 2017/0134882 A1* | 5/2017 | Kao | H04W 72/1215 |
| 2017/0264395 A1* | 9/2017 | Wakabayashi | H04L 1/1819 |
| 2018/0048350 A1* | 2/2018 | Hammerschmidt | H04W 72/51 |
| 2019/0246341 A1* | 8/2019 | Dong | H04B 17/318 |
| 2019/0261394 A1* | 8/2019 | Li | H04W 72/23 |
| 2019/0334666 A1* | 10/2019 | Damnjanovic | H04L 5/0012 |
| 2019/0349929 A1* | 11/2019 | Soro | H04L 67/535 |
| 2020/0336520 A1* | 10/2020 | Redding | H04L 65/61 |
| 2021/0400411 A1* | 12/2021 | Lee | H04R 5/033 |

FOREIGN PATENT DOCUMENTS

| | | | | |
|---|---|---|---|---|
| CN | 109983708 A | * | 7/2019 | B64C 39/024 |
| WO | WO-2014075555 A1 | * | 5/2014 | H04L 47/28 |

OTHER PUBLICATIONS

WO-2014075555-A1 English translation (Year: 2014).*

* cited by examiner

*Primary Examiner* — Yu-Wen Chang
(74) *Attorney, Agent, or Firm* — Fay Kaplun & Marcin, LLP

(57) ABSTRACT

A user equipment (UE) tunes a transceiver of the UE to a first frequency associated with a first channel, transmits a first short packet to a second UE on the first channel and determines whether a first indication was received from the second UE in response to the first short packet. The first indication indicates that the first channel satisfies one or more predetermined criteria. The UE transmits then the primary data to the second UE on the first channel in response to the first indication being received from the second UE.

20 Claims, 3 Drawing Sheets

FEEDBACK-BASED FREQUENCY HOPPING

BACKGROUND

A user equipment (UE) may communicate wirelessly with a further UE via a short-range communication protocol. For example, the UE may be a primary device and the further UE may be secondary device. The primary device and the secondary device may communicate via the short-range communication protocol to perform various operations, such as streaming audio or video.

SUMMARY

Some exemplary embodiments are related to a processor of a user equipment configured to perform operations. The operations include tuning a transceiver of the UE to a first frequency associated with a first channel, transmitting a first short packet to a second UE on the first channel and determining whether a first indication was received from the second UE in response to the first short packet. The first indication indicates that the first channel satisfies one or more predetermined criteria. The UE transmits the primary data to the second UE on the first channel in response to the first indication being received from the second UE.

Other exemplary embodiments are related to a user equipment (UE) comprising a transceiver configured to communicate with a network and a processor communicatively coupled to the transceiver. The processor configured to perform operations comprising tuning the transceiver of the UE to a first frequency associated with a first channel, transmitting a first short packet to a second UE on the first channel and determining whether a first indication was received from the second UE in response to the first short packet. The first indication indicates that the first channel satisfies one or more predetermined criteria. The UE transmits the primary data to the second UE on the first channel responsive to the first indication being received from the second UE.

DETAILED DESCRIPTION

Figure 1:
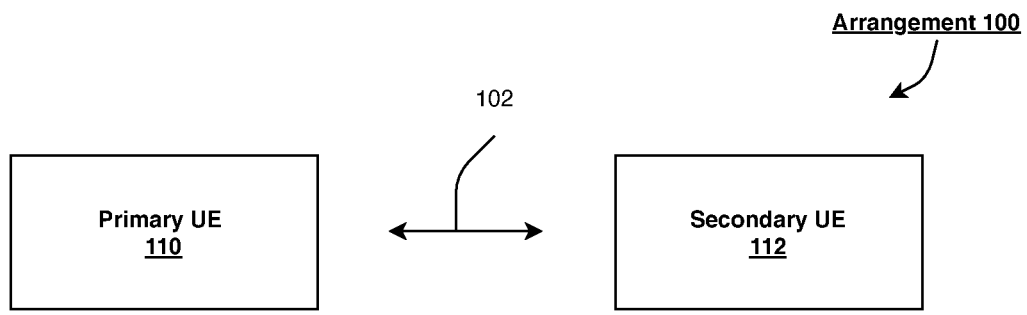
FIG. 1 shows an example arrangement of a user equipment (UE) and further UE according to various exemplary embodiments.

The exemplary embodiments may be further understood with reference to the following description and the related appended drawings, wherein like elements are provided with the same reference numerals. The exemplary embodiments describe a user equipment (UE) (a primary device) performing a feedback-based frequency hopping while communicating with a further UE (a secondary device) over a short-range communication protocol.

The exemplary embodiments are described with regard to a UE. However, the use of a UE is merely for illustrative purposes. The exemplary embodiments may be utilized with any electronic component that may establish a wireless connection with a network and/or another electronic device and is configured with the hardware, software, and/or firmware to exchange information and data with the network and/or other electronic device. Therefore, the UE as described herein is used to represent any electronic component and may be the primary device and/or the secondary device.

In addition, throughout this description it may be considered that the primary device is the transmitting device and the secondary device is the receiving device. However, it should be understood that the communication channel may be bidirectional and the operations performed by the primary device may also be performed by the secondary device when the secondary device is transmitting and the operations performed by the secondary device may also be performed by the primary device when the secondary device is transmitting.

The exemplary embodiments are also described with regard to a short-range communication protocol that enables short-range communication between two or more devices. Various examples described herein may reference Bluetooth (e.g., Bluetooth, Bluetooth Low-Energy (BLE), etc.), which is a specific type of short-range communication protocol. However, the exemplary embodiments may be implemented using any type of wireless communication protocol or personal area network (PAN), e.g., WiFi Direct, etc. Throughout this description, any reference to the terms such as, "Bluetooth," "short-range communication protocol," "short-range connection," or "short-range communication link" is merely provided for illustrative purposes. The exemplary embodiments may apply to any appropriate type of communication protocol.

As noted above, a primary device may wirelessly communicate with a secondary device over a short-range communication protocol. One example of such a short-range communication protocol may include a Bluetooth connection between a primary device (a companion device, such as a mobile phone) and secondary device (an accessory device). Another example may include a short-range communication such as, for example a WiFi connection, between a UE and a wireless access point (AP). During such short-range communications, the quality of a channel over which the devices communicate may change. For example, the channel may observe a high loss period(s) during which packets transmitted over the channel have a high likelihood of being lost. As such, the UE typically performs a frequency hopping (FH) after each data transmission to avoid remaining on the same channel and possibly sending a subsequent data packet over the same channel during a high loss period on that channel. In addition, the FH may also allow the UE to avoid interference. However, the UE performs this FH blindly without any indication of the channel quality on the new frequency. As a result, the transmission of the subsequent data packet on the new frequency may fail, thus requiring another blind FH and retransmission of the failed data packet. This results in wasted air time, increased power consumption on the part of the UE, and less UEs being able to communicate during this blind FH operation.

According to exemplary embodiments, before transmitting primary data, a primary device performs a first frequency hopping operation to a first channel and transmits a short packet to a secondary device over the first channel. If the first channel meets one or more predetermined criteria (e.g., signal to noise ratio (SNR), received signal strength indicator (RSSI), block error rate (BLER), etc.), then the secondary device transmits an indication to the primary device indicating that data may be transmitted over the first channel. As a result, blind frequency hopping and unnecessary retransmissions of the primary data may be avoided.

FIG. 1 shows an example arrangement 100 of a primary UE 110 and a secondary UE 112 according to various exemplary embodiments. Those skilled in the art will understand that the primary UE 110 may represent any type of electronic component that is capable of communicating with another wireless device. Specific examples of the primary UE 110 include, but are not limited to, mobile phones, tablet computers, desktop computers, smartphones, embedded devices, wearables, Internet of Things (IoT) devices, video game consoles, media players, entertainment devices, smart speakers, smart TVs, streaming devices, set top boxes, wireless earbuds, wireless headphones, etc. It should be noted that the terms "primary UE" and "secondary UE" may be used interchangeably throughout this description and are merely used to differentiate between the two UEs 110, 112.

The arrangement 100 shows a short-range communication link 102 between the primary UE 110 and the secondary UE 112. In this example, the short-range communication link 102 may be a Bluetooth connection or any other appropriate type of connection. Therefore, the primary and secondary UEs 110, 112 may be equipped with an appropriate chipset to communicate using a short-range communication protocol.

The short-range communication link 102 may be established using a manual approach, an automated approach or a combination thereof. The manual approach refers to a process in which user input at one or more of the devices triggers the initiation of a connection establishment procedure. The automated approach refers to a mechanism in which connection establishment is initiated without a user-supplied command, e.g., using sensor data, proximity detection, an automated trigger, and/or other operations.

A primary/secondary relationship between the UEs 110, 112 may be dynamic. For example, at a first time, the primary UE 110 may be set as the primary device and the secondary UE 112 may be set as the secondary device. Subsequently, a predetermined condition may trigger the secondary UE 112 to be set as the primary device. Thus, at a second time, the secondary UE 112 may be set as the primary device and the primary UE 110 may be set as the secondary device. During a session (e.g., streaming, a call, etc.), the UEs 110, 112 may switch roles any number of times. However, for purposes of the following description, the primary UE 110 will be referred to as the primary device and the secondary UE 112 will be referred to as the secondary device.

Figure 2:
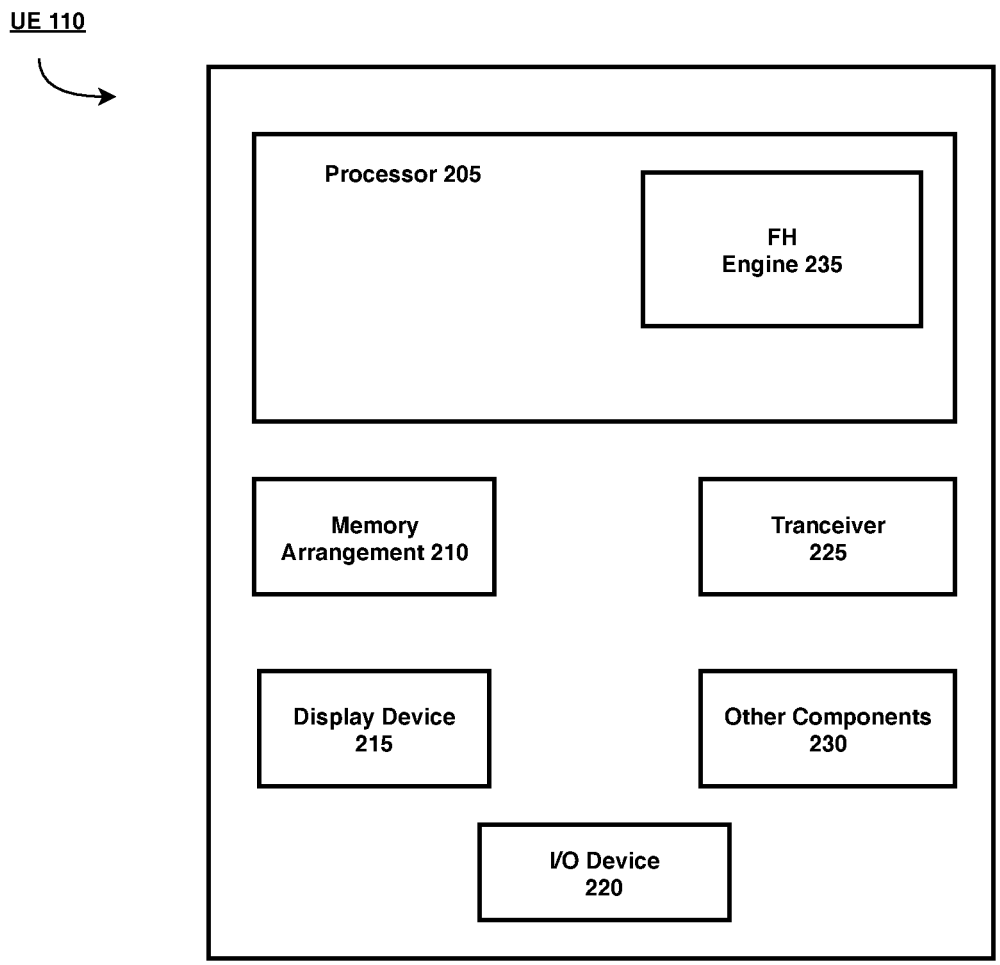
FIG. 2 shows an exemplary UE according to various exemplary embodiments.

FIG. 2 shows an example UE 110 according to various exemplary embodiments. The UE 110 will be described with regard to the arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a frequency hopping (FH) engine 235. The FH engine 235 may be configured to perform operations related to feedback-assisted FH, as will be described in greater detail below.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen.

The transceiver 225 may represent one or more hardware components configured to perform operations related to wireless communication. For example, the transceiver 225 may represent one or more radios configured to communicate with a cellular network, a PAN, a wireless local area network (WLAN), etc. As indicated above, the exemplary embodiments may include the UE 110 communicating with a further UE using FH. Accordingly, the transceiver 225 may operate on a variety of different frequencies or channels (e.g., set of consecutive frequencies).

Figure 3:
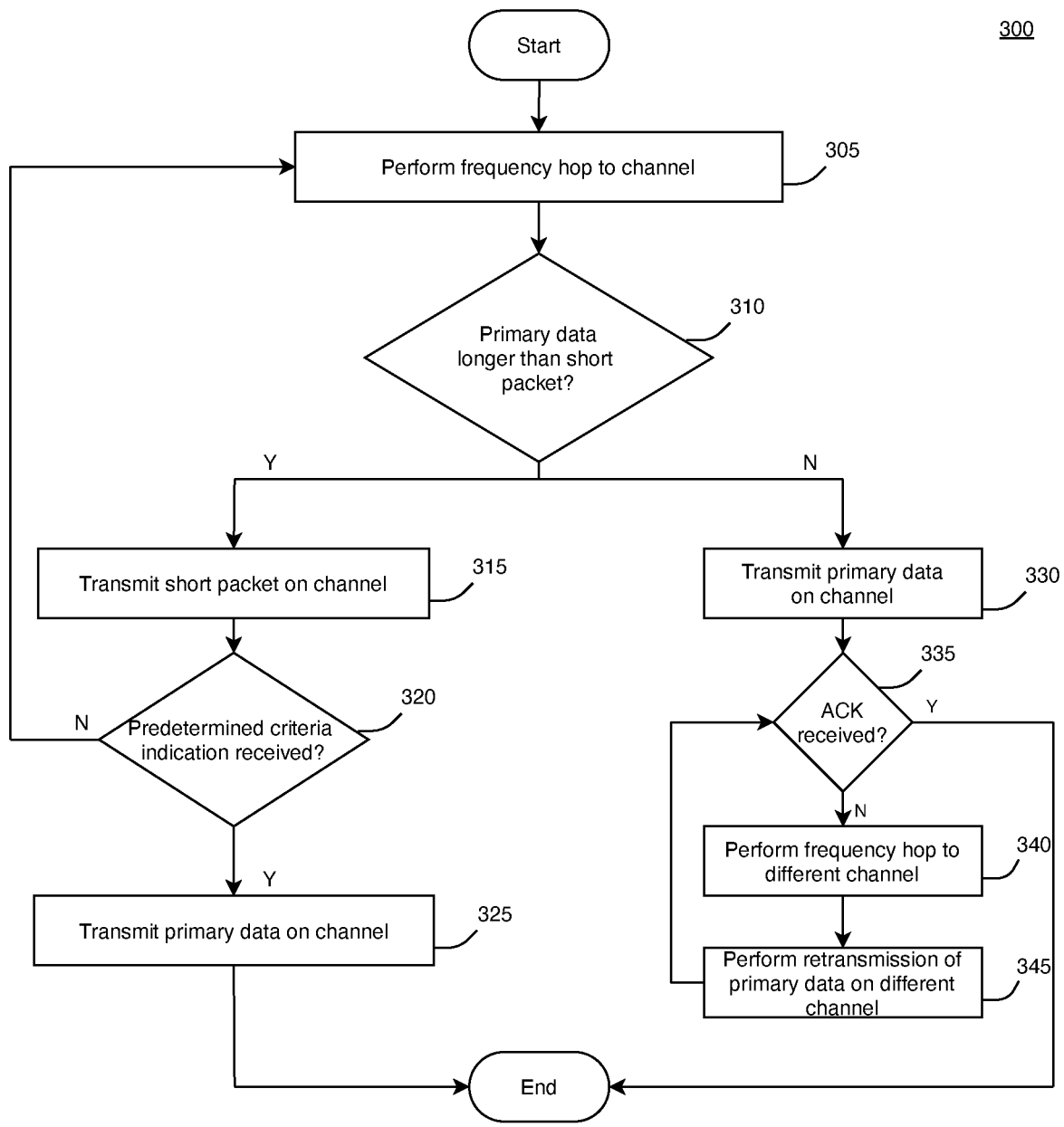
FIG. 3 shows an exemplary method of performing feedback-based frequency hopping by a UE according to various exemplary embodiments.

FIG. 3 shows a method 300 of performing feedback-based frequency hopping by a UE (e.g., primary UE 110) according to various exemplary embodiments. The description of the method 300 will also make reference to FIG. 4, which shows a diagram illustrating a feedback-based frequency hopping operation performed by a UE according to various exemplary embodiments. At 305, the primary UE 110 performs a frequency hopping operation to switch its current frequency to a first frequency of a first channel. At 310, the primary UE 110 determines whether the primary data 410 that is to be transmitted to the secondary UE 112 has a longer duration than a short packet 402. It should be noted that the term "short" here is relative to the primary data 410 which the primary UE 110 intends to transmit to the secondary UE 110. For example, a short packet 402 may have a duration that is equivalent to half a slot 412, whereas the primary data 410 has a duration on the order of one or more slots.

In some embodiments, the short packet 402 may be any type of low priority data such as, for example, keep alive messages, control information, FH information, advertisement packets, scan packets, etc. In other embodiments, the short packet 402 may be a portion of the primary data 410. In further embodiments, the short packet 402 may include an indication for the secondary UE 112 that the primary UE 110 is attempting to check on the channel quality of the current transmission channel. From these examples it can be seen that the short packet 402 may include various types of information and is not limited to any specific type of data.

If the primary data 410 has a longer duration than the short packet 402, then, at 315, the primary UE 110 transmits the short packet 402 to the secondary UE 112 on the first channel.

At 320, the primary UE 110 determines whether it has received an indication 408 from the secondary UE 112 that the first channel on which the short packet 402 was transmitted meets one or more predetermined criteria. In some embodiments, the predetermined criteria include a predefined signal to noise ratio (SNR) threshold. In other embodiments, the predetermined criteria may additionally or alternatively include a predefined received signal strength indicator (RSSI) threshold. It should be understood that the predetermined criteria may include any criteria that indicates a quality of the currently used channel.

The indication 408 may be any type of transmission from the secondary UE 112 to the primary UE 110 that indicates to the primary UE 110 that transmissions may continue on the first channel. In some embodiments, the indication 408 may be an acknowledgement (ACK) that the short packet 402 was successfully received by the secondary UE 112. In some embodiments, if the secondary UE 110 needs to transmit data to the primary UE 110, the indication 408 may alternatively be the actual transmission of that data to the primary UE 110. The transmission of this data would indicate to the primary UE 110 that the channel quality of the first channel is satisfactory. It should be noted that the indication 408 may alternatively or additionally include any other data or feedback from the secondary UE 112 to the primary UE 110 that indicates the short packet 402 was successfully received and that transmission may continue on the first channel.

Figure 4:
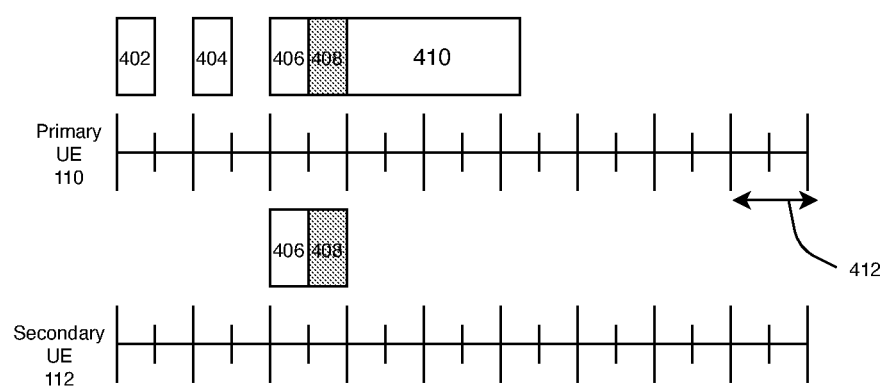
FIG. 4 shows an exemplary diagram illustrating a feedback-based frequency hopping operation performed by a UE according to various exemplary embodiments.

If, at 320, the primary UE 110 does not receive the indication 408, then the method 300 returns to 305, where the primary UE 110 performs a frequency hopping operation to switch its frequency to a second frequency of a second channel. In the example of FIG. 4, it may be considered that the primary UE 110 did not receive an indication 408 in response to the first two short packets 402 and 404. Thus, after transmitting the short packets 402 and 404, the primary UE 110 will return to the operation 305 and perform a frequency hopping to a different frequency. The primary UE 110 repeats 305-325 until it receives an indication 408 in response to one of the short packets 402-406 from the secondary UE 112 that the current channel meets the predetermined criteria.

If, at 320, the primary UE 110 receives the indication 408, then the primary UE 110 transmits the primary data 410 on the first channel at 325. Again, in the example of FIG. 4, the primary UE receives an indication 408 in response to the short packet 406 and then sends the primary data 410 on the same channel as the short packet 406. As a result, air time is not wasted on multiple transmissions and retransmission(s) of the primary data 410 on channels that do not meet the predetermined criteria.

If, at 310, the primary UE 110 determines that the primary data 410 does not have a longer duration than the short packet 402 (or 404 or 406), then, at 330, the primary UE 110 transmits the primary data 410 on the first channel. At 335, the primary UE 110 determines whether an ACK has been received from the secondary UE 112 in response to the primary data transmission. If an ACK is received, then the method 300 ends.

If, however, an ACK is not received at 335 (or a NACK is received), then, at 340, the primary UE 110 performs another frequency hop to switch its frequency to a second frequency of a second channel. At 345, the primary UE 110 retransmits the primary data 410 on the second channel. The method then returns to 335, where the primary UE 110 determines if an ACK has been received in response to the primary data retransmission.

The method 300 advantageously allows the primary UE 110 to dynamically switch between (a) transmitting short packets (402-406) to elicit feedback from the secondary UE 112 regarding the quality of a channel and (b) transmitting the primary data 410 on a channel after performing a frequency hop if the primary data has a duration less than or equal to the short packets.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a first user equipment (UE) configured to perform operations comprising:
    tuning a transceiver of the first UE to a first frequency associated with a first channel;
    transmitting a first short packet to a second UE on the first channel, wherein the first short packet has a duration of less than one slot;
    determining whether to transmit primary data over the first channel based on whether a first indication was received from the second UE in response to the first short packet, wherein the first indication indicates that the first channel satisfies one or more predetermined criteria; and
    transmitting the primary data to the second UE on the first channel in response to the first indication being received from the second UE.

2. The processor of claim 1, wherein the operations further comprise:
    tuning the transceiver to a second frequency associated with a second channel when the first indication is not received from the second UE;
    transmitting a second short packet to the second UE on the second channel;

determining whether a second indication was received from the second UE in response to the second short packet; and transmitting the primary data to the second UE on the second channel responsive to the second indication being received from the second UE.

3. The processor of claim 2, wherein the first short packet and the second short packet each comprise a portion of data contained in the primary data.

4. The processor of claim 1, wherein the one or more predetermined criteria comprise at least one of a predefined signal to noise ratio (SNR) value or a predefined received signal strength indicator (RSSI) value.

5. The processor of claim 1, wherein the first indication comprises an acknowledgement that the first short packet was successfully received by the second UE.

6. The processor of claim 1, wherein the first indication is part of a secondary data transmission from the second UE.

7. The processor of claim 1, wherein the operations further comprise:

prior to transmitting the first short packet, determining a length of the first short packet and a length of the primary data.

8. The processor of claim 7, wherein the operations further comprise:

transmitting the primary data to the second UE on the first channel when the primary data has a shorter duration than the first short packet.

9. The processor of claim 8, wherein the operations further comprise:

determining if a first acknowledgement has been received from the second UE in response to the primary data transmission.

10. The processor of claim 9, wherein the operations further comprise:

tuning the transceiver to a second frequency associated with a second channel if the first acknowledgement is not received from the second UE; and transmitting the primary data to the second UE on the second channel.

11. A first user equipment (UE), comprising:

a transceiver configured to communicate with a network; and a processor communicatively coupled to the transceiver and configured to perform operations comprising:

tuning the transceiver of the first UE to a first frequency associated with a first channel;

transmitting a first short packet to a second UE on the first channel, wherein the first short packet has a duration of less than one slot;

determining whether to transmit primary data over the first channel based on whether a first indication was received from the second UE in response to the first short packet, wherein the first indication indicates that the first channel satisfies one or more predetermined criteria; and transmitting the primary data to the second UE on the first channel responsive to the first indication being received from the second UE.

12. The UE of claim 11, wherein the operations further comprise:

tuning the transceiver to a second frequency of a second channel when the first indication is not received from the second UE;

transmitting a second short packet to the second UE on the second channel;

determining whether a second indication was received from the second UE in response to the second short packet; and transmitting the primary data to the second UE on the second channel responsive to the second indication being received from the second UE.

13. The UE of claim 12, wherein the first short packet and the second short packet each comprise a portion of data contained in the primary data.

14. The UE of claim 11, wherein the one or more predetermined criteria comprise at least one of a predefined signal to noise ratio (SNR) value or a predefined received signal strength indicator (RSSI) value.

15. The UE of claim 11, wherein the first indication comprises an acknowledgement that the first short packet was successfully received by the second UE.

16. The UE of claim 11, wherein the first indication is part of a secondary data transmission from the second UE.

17. The UE of claim 11, wherein the operations further comprise:

prior to transmitting the first short packet, determining a length of the first short packet and a length of the primary data.

18. The UE of claim 17, wherein the operations further comprise:

transmitting the primary data to the second UE on the first channel when the primary data has a shorter duration than the first short packet.

19. The UE of claim 18, wherein the operations further comprise:

determining if a first acknowledgement has been received from the second UE in response to the primary data transmission.

20. The UE of claim 19, wherein the operations further comprise:

tuning the transceiver to a second frequency associated with a second channel if the first acknowledgement is not received from the second UE; and transmitting the primary data to the second UE on the second channel.

* * * * *